(12) United States Patent
Fiducci

(10) Patent No.: US 8,126,990 B2
(45) Date of Patent: Feb. 28, 2012

(54) DATA BACKUP AND TRANSFER SYSTEM, METHOD AND COMPUTER PROGRAM PRODUCT

(76) Inventor: Thomas E. Fiducci, Chicago, IL (US)

( * ) Notice: Subject to any disclaimer, the term of this patent is extended or adjusted under 35 U.S.C. 154(b) by 744 days.

(21) Appl. No.: 11/408,728

(22) Filed: Apr. 21, 2006

(65) Prior Publication Data

US 2006/0242273 A1     Oct. 26, 2006

Related U.S. Application Data

(60) Provisional application No. 60/673,751, filed on Apr. 21, 2005.

(51) Int. Cl.
   *G06F 15/177* (2006.01)
(52) U.S. Cl. ......................... 709/220; 709/213
(58) Field of Classification Search .................. 709/213, 709/220–222; 707/3; 726/4
   See application file for complete search history.

(56) References Cited

U.S. PATENT DOCUMENTS

| | | | |
|---|---|---|---|
| 6,351,776 B1 | 2/2002 | O'Brien et al. | 709/245 |
| 6,571,245 B2 | 5/2003 | Huang et al. | 707/10 |
| 6,704,873 B1 | 3/2004 | Underwood | |
| 7,181,445 B2 * | 2/2007 | Bebo et al. | 707/3 |
| 7,814,536 B2 * | 10/2010 | Martherus et al. | 726/8 |
| 2002/0194205 A1 * | 12/2002 | Brown et al. | 707/200 |
| 2004/0153830 A1 * | 8/2004 | Cebula et al. | 714/38 |
| 2004/0230669 A1 * | 11/2004 | Teh | 709/219 |
| 2004/0243686 A1 * | 12/2004 | Schilders | 709/213 |
| 2005/0021613 A1 | 1/2005 | Schmeidler et al. | |
| 2005/0097440 A1 * | 5/2005 | Lusk et al. | 715/500.1 |
| 2006/0133414 A1 * | 6/2006 | Luoma et al. | 370/466 |
| 2008/0028050 A1 | 1/2008 | Fiducci | |
| 2008/0295156 A1 * | 11/2008 | Kitada et al. | 726/4 |

OTHER PUBLICATIONS

A B Cryer. *Internet Virtual Storage*. 2004 <www.cryer.co.uk/resources/virtualstorage.htm> accessed on Jun. 22, 2004.
doneasy. *Carpefore, Inc. Launches its First Service Website*, doneasy.com. 2000-2003 <http://www.doneasy.com/about/press.php> accessed on Jun. 24, 2004.
doneasy. *Services*. 2000-2003 <http://www.doneasy.com/services/services.php?cmd=file> accessed on Aug. 20, 2004.
EMAIL ADDRESSES.com. *Calendars, To-Do Lists and PIMS*. <www.emailaddresses.com/email_pim.htm> accessed on Jun. 21, 2004.
info@ZNAIL.com. ZNAIL *"For easier living in a virtual world"*. 1998-2004 <http:znail.com> accessed on Jun. 22, 2004.

(Continued)

*Primary Examiner* — Kenneth R Coulter
(74) *Attorney, Agent, or Firm* — Greer, Burns & Crain, Ltd.

(57) ABSTRACT

A backup system having a plurality of accounts for copying selected data between one or more account user computers and a system computer where an account user's computer connects to the system computer via the Internet. Selected data is copied between the account user's computer and the system computer including, documents, media files, and email in any file type or format. Additionally, the system is compatible with all types of computers, including personal data assistants and mobile telephones, and all types of operating systems. All of the software to operate the system is resident on the system computer with no hardware or software required on the account user computer beyond a conventional web browser. The system also includes a scheduler, a contacts manager, a reminder generator and file transfer system for third-party users.

18 Claims, 21 Drawing Sheets

OTHER PUBLICATIONS

Infone LLC. *Infone Contacts and Calendars*. 2002-2004 <www.infone.com/info.xwt?view-contact.calendar> accessed on Jun. 21, 2004.

Norton e-zine. *Work the Web: Online File Storage*. <http://www.glencoe.com/norton/online/ezine/display_article.phtml?id=233> accessed on Jun. 21, 2004.

Yahoo Media Relations. *Yahoo! Calendar Introduces Time Guides*. 2001 <http://docs.yahoo.com/docs/pr/release397.html> accessed on Jun. 24, 2004.

Yahoo Media Relations. *Yahoo! Briefcase Is the One Place on the Internet to Keep Photos, Documents and Other Files*. 2001 <http://docs.yahoo.com/docs/pr/release352.html> accessed on Jun. 24, 2004.

Office Action, Mailing Date of Jul. 6, 2009, which issued in Applicant's co-pending U.S. Appl. No. 11/879,997.

USPTO Notice of Allowance relating to co-pending U.S. Appl. No. 11/879,997, mailed Jan. 19, 2010.

Amendment B, filed by Applicant on Apr. 6, 2010, for co-pending U.S. Appl. No. 11/879,997.

* cited by examiner

FIG. 5

DATA BACKUP AND TRANSFER SYSTEM, METHOD AND COMPUTER PROGRAM PRODUCT

CROSS-REFERENCE

This application claims priority from U.S. Provisional Patent Application No. 60/673,751 filed Apr. 21, 2005.

FIELD OF THE INVENTION

The subject application relates to a system, method and computer program product for computer data backup and storage, appointment scheduling, automatic reminder generating, and third-party data transfer.

BACKGROUND OF THE INVENTION

With the increasing complexity of today's software and the proliferation of computer viruses, spyware and malware, computer crashes are not an uncommon occurrence. When a user's computer suffers a catastrophic crash, the computer may not restart properly or the user may discover that his hard drive has been damaged or erased. Such permanent damage to a user's files is particularly common where virus or malicious software is involved. When such damage occurs the data on the user's computer will be lost, unless the user has previously saved the files on other storage media other than the local computer's hard drive.

Data can also be lost due to physical damage of the computer or computer data storage device. Portable computers, including notebook computers, hand held computes such as personal data assistants ("PDA") and mobile telephones are particularly vulnerable to physical damage as well as theft. Often loss of the data is more significant than the loss or damage to the hardware. Accordingly, data backup is important.

Conventional file backup systems typically involve hardware and software that copy all files on a computer. The entire drive—including large programs, hidden files, and other extraneous data—is typically copied, compressed and then either stored on local storage media, such as an attached disk or a special partition of the user's computer hard drive. This process is time-consuming and typically must be done when the user is not already using the computer as the conventional backup process will be interrupted when the backup system attempts to copy a system file that is in use. Further, restoring a computer from a back-up is a tedious and lengthy process. The difficulty of this process is especially problematic if the user needs immediate access to data that was only saved on his damaged computer.

Another common problem is missed obligations, such as driver license renewal, license plate sticker renewal, annual payments and birthdays, just to name a few. Today it is the individual's responsibility to keep up with the many obligations, regardless of notifications by government agencies or the like. Even if a notice, e.g. license renewal, does not reach the individual, he/she is still held responsible. Appointment books in both manual and computerized from are commonly used to calendar dates, but these systems are not entirely satisfactory. Furthermore, if a computer-based calendar is used, and the computer is damaged or crashes, appointments and other dates are lost.

OBJECTS OF THE INVENTION

It is an object of the invention to provide a system, method and computer program product whereby a user can easily select data to be copied to a system computer, and can also easily transfer data back to the user's computer once it has been repaired or to a new computer if the first computer cannot be repaired following a crash. It is also desirable that the data saved in the system computer may also include appointments, contact information, emails and other data.

It is also an object of the invention to solve compatibility problems between different types of computers, including PDA's and mobile telephones, and operating systems as pertains to data backup, storage and transfer.

It is a further object of the invention to provide a data backup and storage system, method and computer program product that operates without any need to install backup, file transfer, or other application software on the user's computer. It is desired to have a system that requires only conventional web browser software on the user's computer.

It is another object of the invention to provide a system, method and product that can provide reminders to the user of important appointments and dates, and whereby the dates and other data are secure.

It is a further object to have a multi-user version of the system, method and product that can host multiple users for backup data storage. A multi-user account is particularly suited for business applications, where an account administrator could manage the access levels of multiple sub-accounts, each sub-account corresponding to a single user.

Finally, it is an object to provide a system, method and product that quickly enables the transfer of files, especially large files, from one computer to another computer over the Internet.

BRIEF SUMMARY OF THE INVENTION

One or more of the above-listed objects are met or exceeded by each of the embodiments of the data backup system, method and computer program product disclosed herein. The various embodiments disclosed combine ease of use with robust functionality. A system embodiment of the invention is provided for use by a plurality of account users to copy selected data between one or more account user computers and a system computer, each account user computer having a storage device, a display and means for operative connection to the Internet. The system comprises a system computer having a system storage device for storing and selectively retrieving data for each respective account, the system computer being operatively connected to the Internet. The system computer verifies account user identification for each account user computer seeking access to the system computer via the Internet. The system computer further scans the storage device of each verified account user computer and causes a first representation of at least a portion of the contents of the verified account user computer storage device and a second representation of at least a portion of the contents of the system computer storage device for the corresponding verified account to be displayed on each account user computer display. This enables the account user to select data files, folders or directories to be uploaded or downloaded to or from the system computer.

A computer program product embodiment of the invention comprises computer executable instructions stored on a system computer readable medium that when read causes one or more computers to execute the following steps: checking for an operative connection between the system computer and a network, and if the system computer is operatively connected; linking an account user computer to the system computer based on an account user identification; scanning the contents of a storage device associated with each linked account user computer; scanning the contents of a partition on the system computer that has been associated with the account user identification; displaying a first representation of the contents of the storage device on the linked account user computer display; simultaneously displaying a second representation of the contents of the partition on the system computer on the linked account user computer display adjacent the first representation; and copying selected files between the connected first computer and system computer.

A method embodiment of the invention is provided for uploading and downloading data between a system computer and a plurality of account user computers, each account user having a system account and an account user identification, the system computer operatively connected to the Internet and capable of being accessed through a system website, the system computer having a data storage device capable of storing and retrieving data for each of a plurality of system accounts. For each user account, the method includes the steps of operatively connecting a first computer to the system website via the Internet; communicating account user identification; verifying account user identification and if verified, operatively connecting the system computer and the first computer; uploading selected data from the user first computer and storing the data on the system computer storage device; operatively connecting a second computer to the system website via the Internet; communicating account user identification; verifying account user identification and if verified; operatively connecting the system computer and the second computer; and downloading at least a portion of said selected data previously stored on the system computer storage device for the user account.

The data backup functions described above in regard to the system, program and method embodiments enable an account user to copy data from his/her computer to a system computer connected to the account user computer over the Internet. The data that can be copied includes documents, music files, image files, email and contact information in any file type or format. The system computer is a secure redundant system. If the user's computer fails for any reason, the copied data can be restored to a new or repaired computer or storage device. All of the software to operate the system is resident on the system computer. Unlike prior art backup systems, no hardware or software need be installed on the account user computer beyond a conventional, Java-compatible web browser, which is now a standard feature on nearly all computers. Because these conventional Internet tools are utilized, compatibility problems are solved allowing the system of the invention to function regardless of different hardware platforms and operating systems.

Preferred embodiments of the system also contain a scheduler, a contacts manager, a reminder generator and/or a file transfer system for third-party users. The scheduler includes the ability to store appointments for days or months in advance and then to either view, print, download or email a daily schedule to the user. The reminder generator is setup to track important dates, and generate periodic reminders. The contacts manager stores contact data in an electronic address book. All of these functions are resident in the secure, off-site redundant system computer. Accordingly, any damage to the account user's computer will not result in lost information. Further, because the system computer can be accessed by an account user from home, the office or practically any computer having Internet access, the system computer can be used as a virtual network server. Thus, for example, an account user can view his/her address book and other data from mobile computers, including notebooks, PDA's and mobile telephones.

The third-party file transfer system comprises a mechanism for the account user to create a second user name and password for access only to designated data. Accordingly, the account user can upload data files and folders to the system computer, and grant access to a third party to download those files. The process facilitates data transfer to third parties, and this is particularly well suited to the transfer of files too large for email transmission, and folders containing multiple files, which cannot be emailed as a folder.

Yet another embodiment of the backup system of the invention is directed to a multi-user system where a single account is divided into sub-accounts, which are managed by an account administrator, who can set various levels of access for the individual account users. Further, the account administrator can post items to a master schedule, which are then placed on the schedules of the holders of the sub-accounts.

Additional features and benefits of the backup system of the invention will become apparent from the drawings and detailed description of the preferred embodiments.

BRIEF DESCRIPTION OF THE SEVERAL VIEWS OF THE DRAWINGS

FIG. 5 is a display of account information screen for a particular user of the data transfer system;

DETAILED DESCRIPTION OF THE PREFERRED EMBODIMENTS

Before discussing exemplary embodiments of the present invention in detail, it will be appreciated that the invention may be embodied in a system, method, and/or a computer program product. For example, a method of the invention may be carried out by one or more users using computers, and a program product of the invention may include computer executable instructions that when executed by one or more computers cause one or more computers to carry out a method of the invention. Further, one or more computer(s) that contains a program product of the invention may embody a system of the invention. It will accordingly be appreciated that in describing a particular embodiment of the present invention, description of other embodiments may also be made. For example, it will be understood that when describing a method of the invention, a system and/or a program product of the invention may likewise be described.

Figure 1:
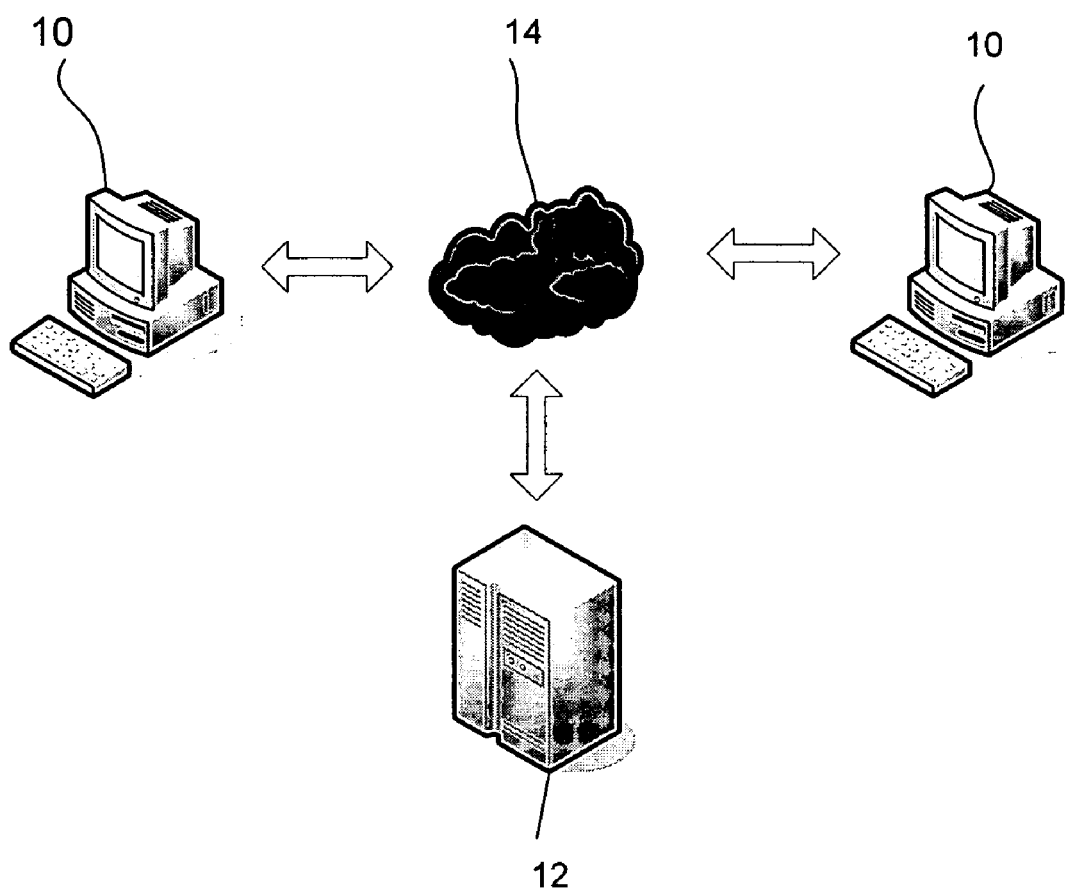
FIG. 1 is a schematic of a multi-user data transfer system.
Figure 2:
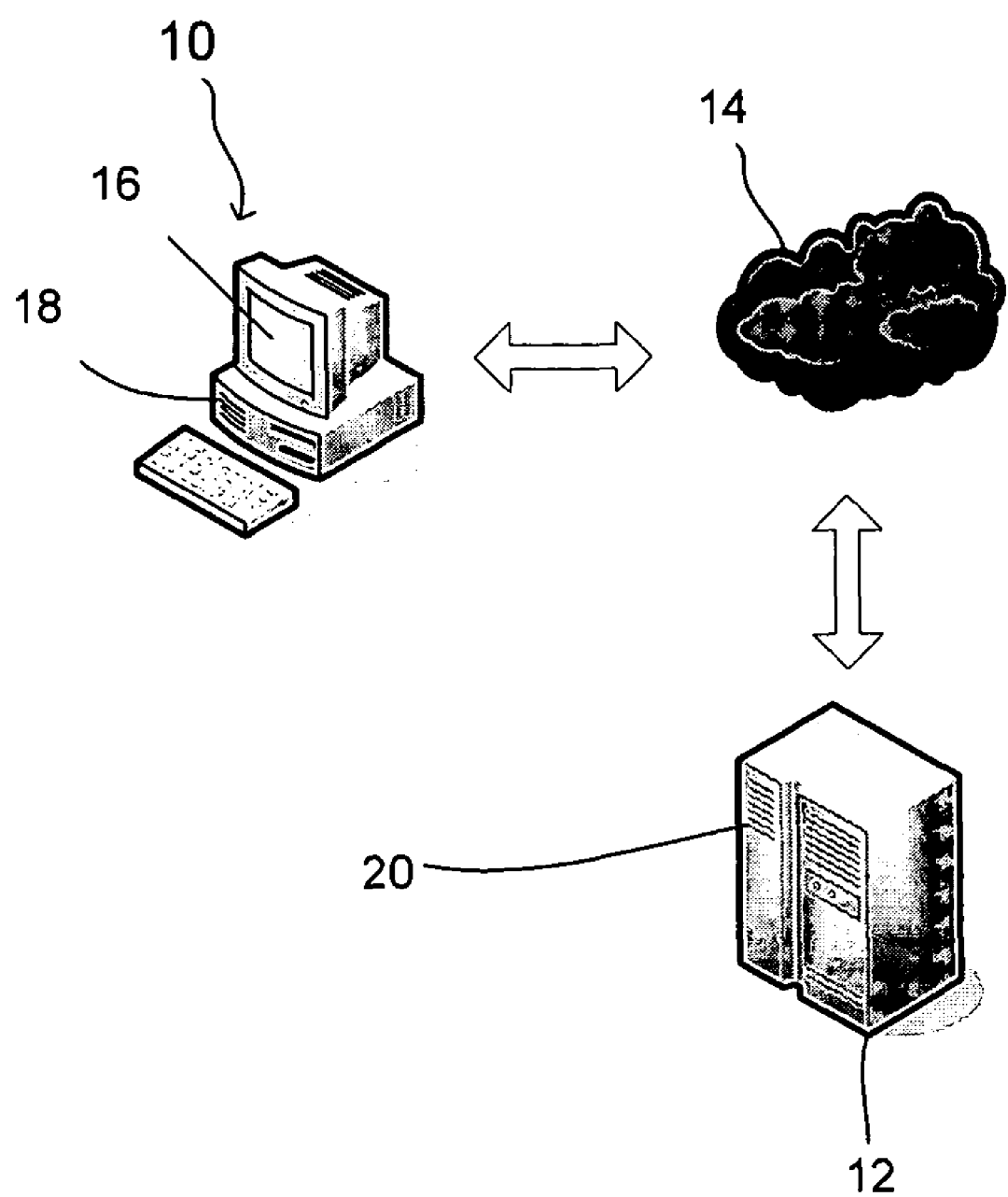
FIG. 2 is a schematic of the system showing an account user computer linked to a system computer.

Turning now to FIG. 1, a first embodiment of the file backup system of the invention is shown. One or more account user computers 10 are connected to a system computer 12 over the Internet 14. The account user computer 10 can be any type of computer, including mobile, home and office computers. The term "computer" is used herein to include any device having a processor capable of executing program instructions, including but not limited to personal computers, notebook computers, hand held personal digital assistants ("PDA") and mobile phones. As used herein the term "account user computer" refers to any computer from which an account user can access the Internet and system computer. As shown in FIG. 2, account user computer 10 has a display 16 and at least one data storage device 18, for example, a hard drive. Any type of hardware and operating system can be used. Web browser software is required, but any browser can be used provided it has a Java plug-in. Substantially all current browsers have Java. Beyond a common browser, no specialized hardware or software need be installed on account user computer 10 to fully utilize the features disclosed herein. Further, the data stored on computer 10 for which backup is desired, can be of any type or format. The present system thereby solves compatibility problems associated with different brands of computers, which is of particular significance with regard to handheld devices and mobile telephones.

System computer 12 preferably comprises multiple redundant computers with redundant data storage devices. In a preferred embodiment, system computer 12 comprises a secure, high speed Unix-based computer behind a 3-layered firewall system that performs a once a day backup of itself to three separate backup computers. System computer 12 includes least one storage device 20 that can store account user data and selectively retrieve data applicable to a specific account only. System computer 12 also hosts the software that operates the backup system of the invention. Because all of the software to operate the system is resident on the system computer, account users are spared the inconvenience and burden of loading or downloading specialized software onto their computers. It follows that all system updates are made only to the system computer, thereby sparing the account users for any need to periodically update software.

Figure 3:
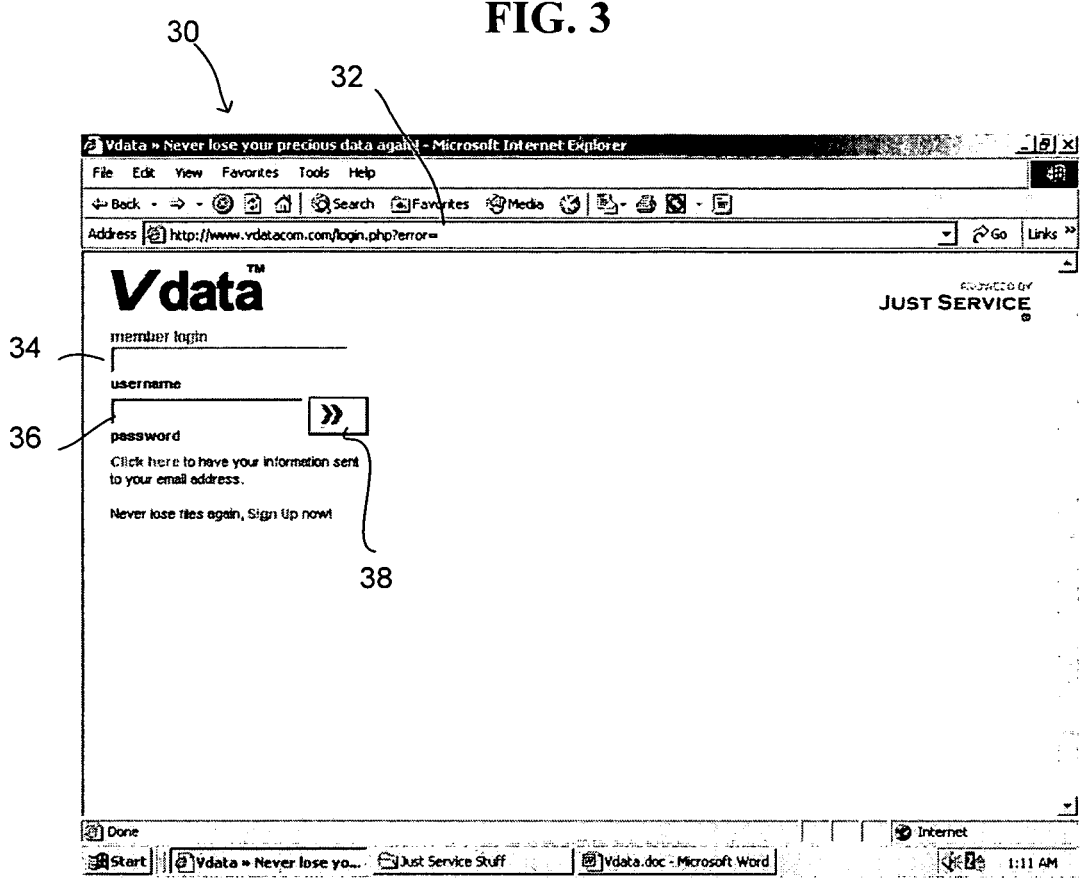
FIG. 3 is a display of a login screen enabling a user to access the data transfer system.

Referring now to FIG. 3, in order to access system computer 12 from an account user computer 10, the user navigates to a system website via the Internet, e.g., <vdatacom.com>, <vdataoffice.com>, <vdatanetworks.com>. After reaching the system website, the account user clicks on a login button, and a login screen 30 appears on user's display 18, having been generated by system computer 12. The user enters his or her user name 34 and password 36, and then selects the enter button 38 to transmit this data to the system computer 12 for verification. This submission of the login and password information can be encrypted using conventional means. Other verification means can be used in lieu of or in addition to the user name and password, for example, the system software can be programmed to check and verify the serial numbers of component parts or other encrypted data unique to the system user computer.

Figure 4:
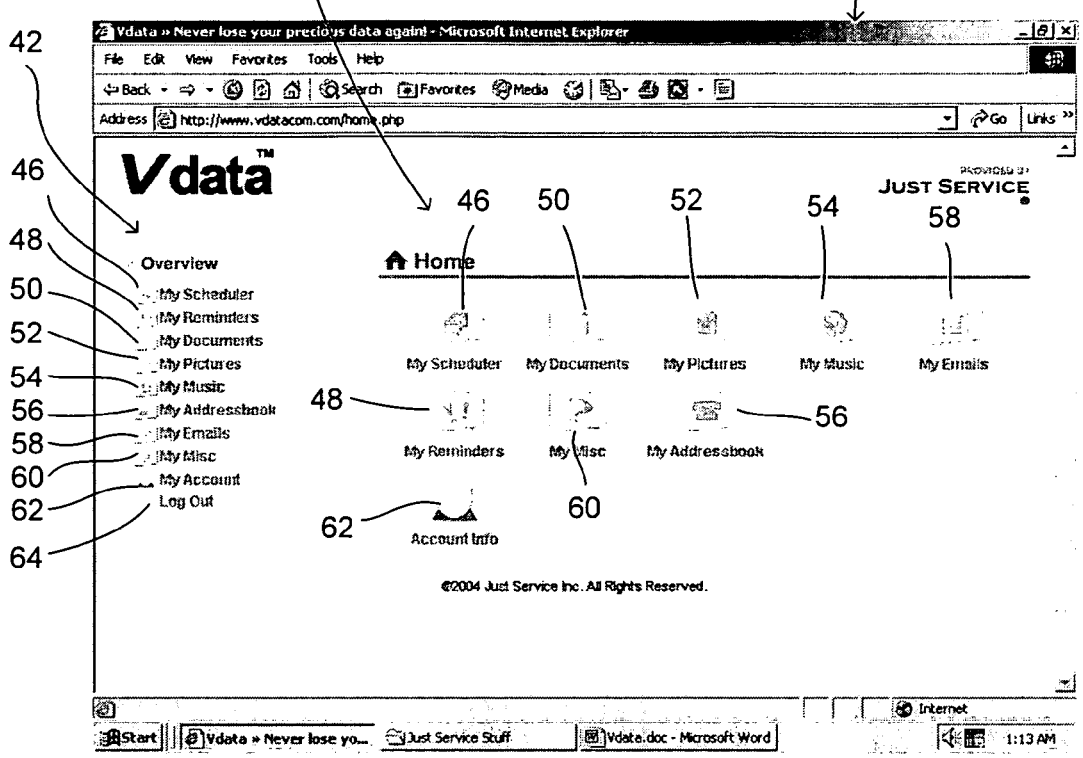
FIG. 4 is a display of a base or main menu page of the data transfer system.

Once the user has successfully accessed the system computer 12 by logging-in, base screen 40 is shown on display 18, as shown in FIG. 4. Base screen 40 optionally includes two different representations of the system functions. One representation is a list view 42 of the system functions and the other representation is an icon view 44 of the system functions. Each representation includes one or more of a scheduler link 46, a reminder system link 48, a document transfer system link 50, a picture transfer system link 52, a music transfer system link 54, a contact storage link 56, an email storage link 58, a miscellaneous storage link 60, and an account manager link 62. A logout link 64 is also provided with the list view 42. List view 42 preferably appears on every screen display of the system to enable the user to navigate between functions. Clicking any of the above links initiates a routine corresponding to the function associated with the selected link. The system computer 12 thereby functions a virtual network server. It allows the user to view and use data from almost any location, using nearly any type of computer, including hand held PDA's and mobile telephones.

Figure 5:
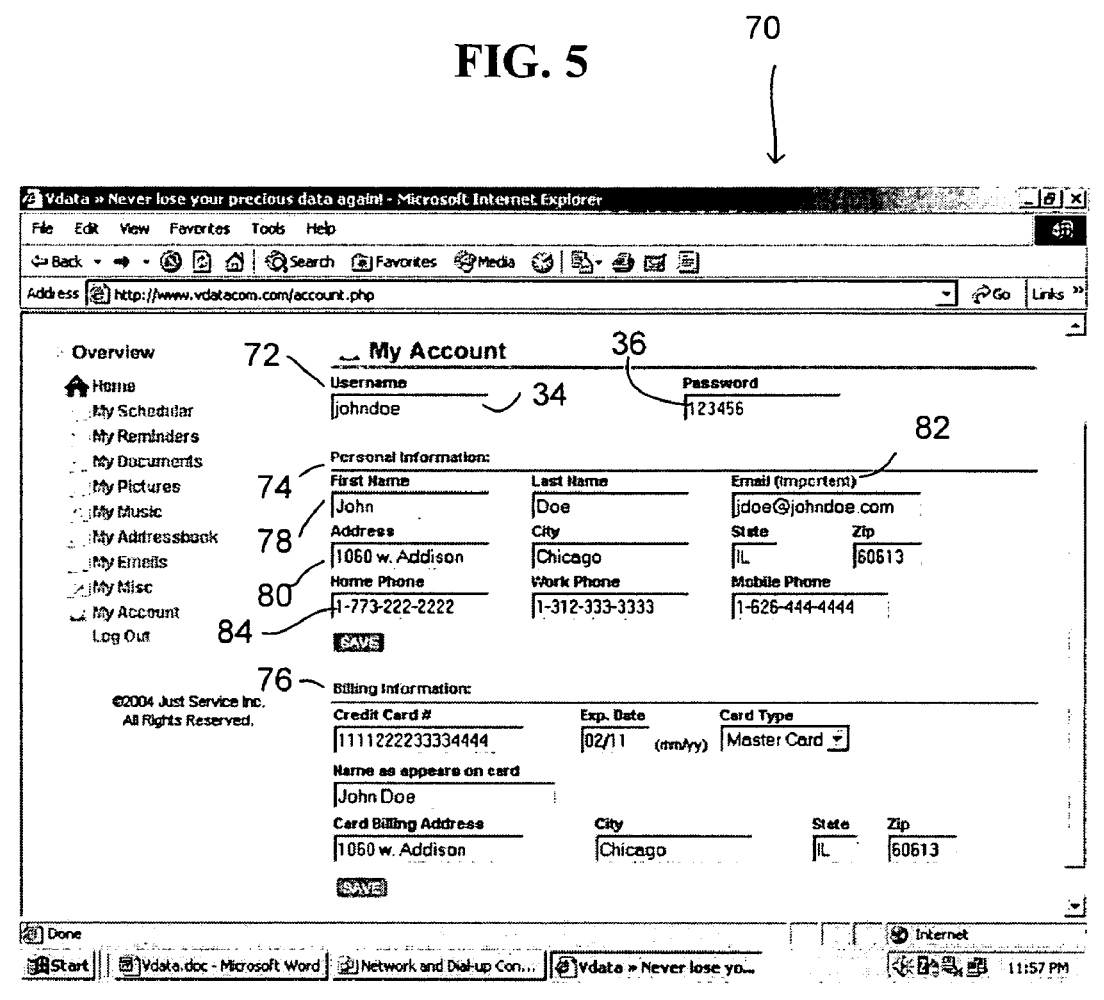

In order to use the system, the user first establishes an account using an account manager 70 which is accessed through account manager link 62. As shown in FIG. 5, account manager link includes a template for entry of account-related information. Such information includes the account user identification (e.g., a user name 34 and password 36), personal information 74 and billing information 76. Personal information 74 includes a name 78, a physical address 80, an electronic communication address 82 (e.g., an email address), and phone numbers 84. Billing information 76 includes standard credit card information including the credit card number, type expiration date, the name appearing on the card, and the card billing address.

Figure 6:
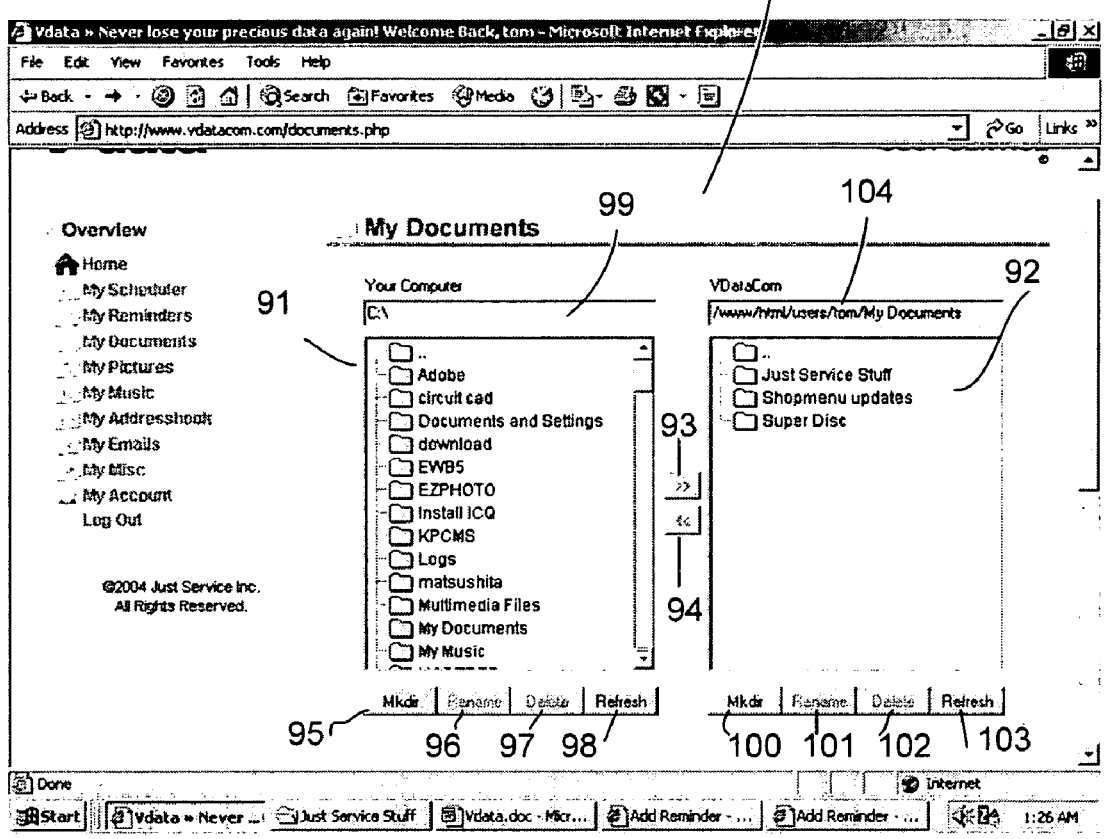
FIG. 6 is a display of a document transfer function of the data transfer system.

Turning now to FIG. 6, the document transfer system 90 is accessed through document transfer function link 50. The system computer then scans the account user storage device 18, and generates a first virtual representation 91 of at least a portion of the account user storage device 18. The system also scans the system storage device 20 to retrieve previously stored data associated with the applicable user account and displays a second virtual representation of at least a portion of such data. These two representations can be displayed on the account user computer display 18 in any manner or sequence, but preferably they are displayed simultaneously, in a single window, side-by-side. The transfer system 90 display also includes at least one, but preferably plural data transfer buttons 93, 94. To copy data from account user storage device 18 to the system storage device 20, the user selects one or more files, folders or directories to be transferred on the first virtual representation 91 and a destination location on the second virtual representation 92 and clicks on a first file transfer button 93. To copy a file stored on the system storage device 20 to the account user's storage device, the user selects the files or folders to be transferred on the second virtual representation 92 and a destination location on the first virtual representation 91, and clicks on a second transfer button 94. Preferably, transfer buttons 93, 94 include arrows to show the direction of file transfer. In operation the system copies the data from the source to the target regardless of data file format of file, for example, encrypted files will be transferred as is.

Each virtual representation includes options to create new directories 95, rename files 96, delete files 97, or refresh 98 the virtual representations to reflect recent files or directories copied from the storage device to the other. The user can create a new directory on the account user storage device 18 by selecting the directory creation function 95. Files or folders on the account user storage device can be renamed by selecting the rename function 96. The new name for the file or folder is entered at data entry box 99 for the first virtual representation 91. Files or folders can be deleted from the account user storage device 18 by selecting files or folders on the first virtual representation 91 and selecting the delete option 97. The virtual representations 91 can be refreshed to reflect recently copied files by selecting the refresh option 98.

The user can create a new directory on the system storage device 20 by selecting the make directory function 100. Files or folders on the system storage device can be renamed by selecting the renamer 101. The new name for the file or folder is entered at data entry box 104 for the second virtual representation 92. Files or folders can be deleted from system storage 20 by selecting files or folders on the second virtual representation 92 and selecting the delete option 102. The second virtual representation 92 can be refreshed to reflect recently copied files by selecting the refresh option 103.

Figure 7:
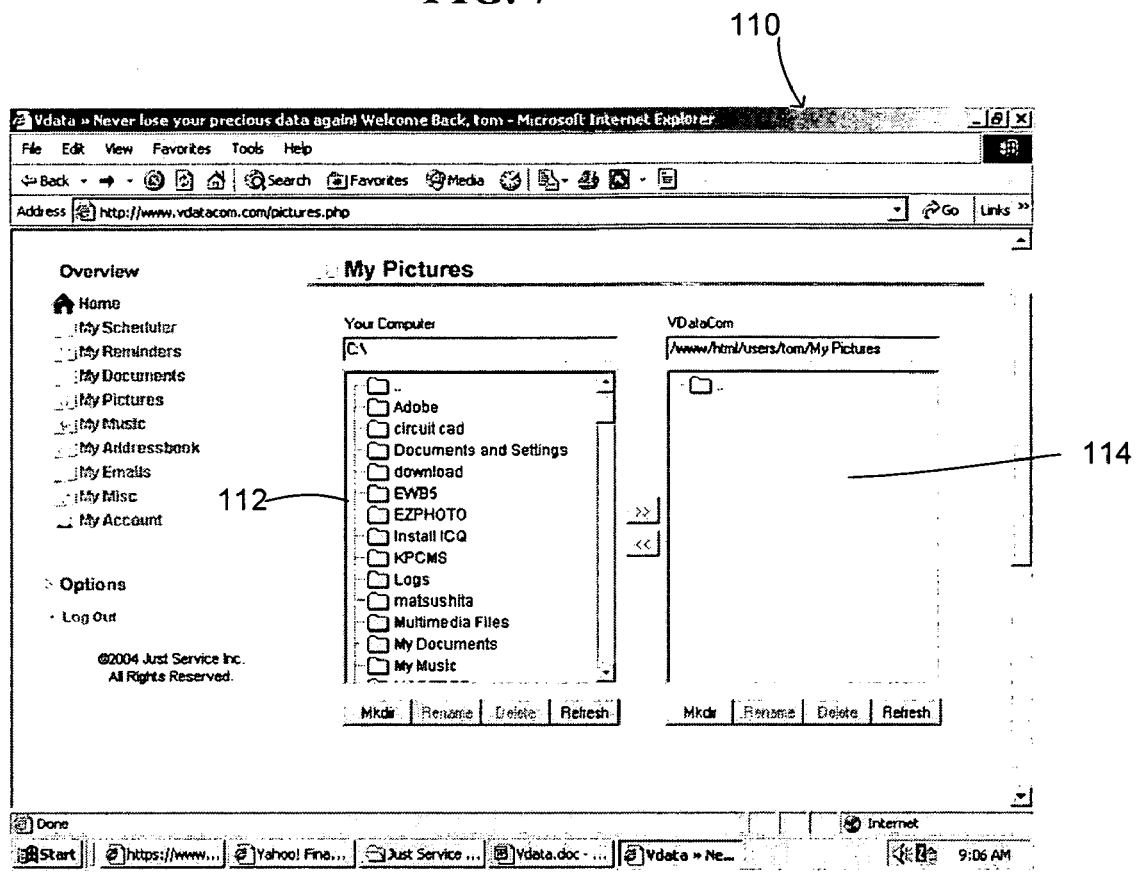
FIG. 7 is a display of a picture transfer function of the data transfer system.

Turning now to FIG. 7, picture transfer system 110 is accessed by selecting the picture transfer system link 52 from base screen 40. As with the document transfer function 52, picture transfer system 110 includes a first virtual representation 112 of the account user storage device 18 and a second virtual representation 114 of the account user partition on the system storage device 20. The picture transfer buttons operates in the same manner as the document transfer systems as described in reference to feature numbers 91-104 in FIG. 6.

Figure 8:
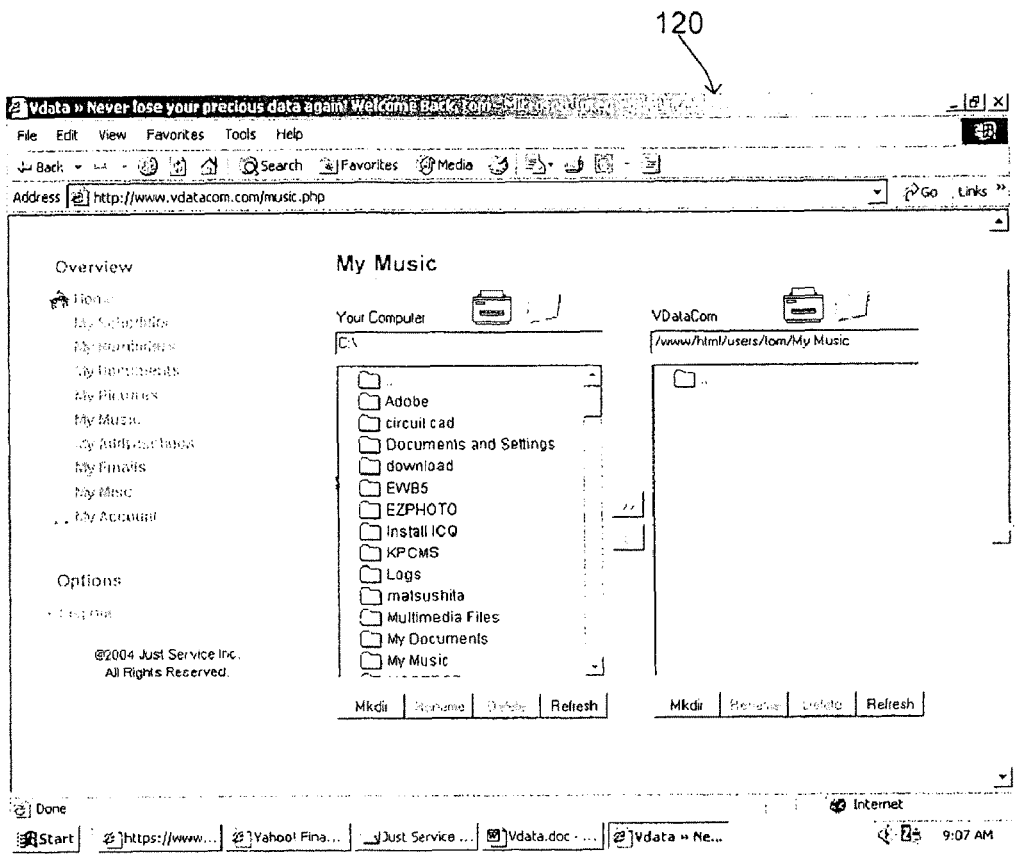
FIG. 8 is a display for a music transfer function for the data transfer system.

Similarly, the music transfer system 120, shown in FIG. 8 also operates in the same manner as the document transfer function. The music transfer buttons operate in the same manner as the document transfer systems as described in reference to feature numbers 91-104 in FIG. 6.

Figure 9:
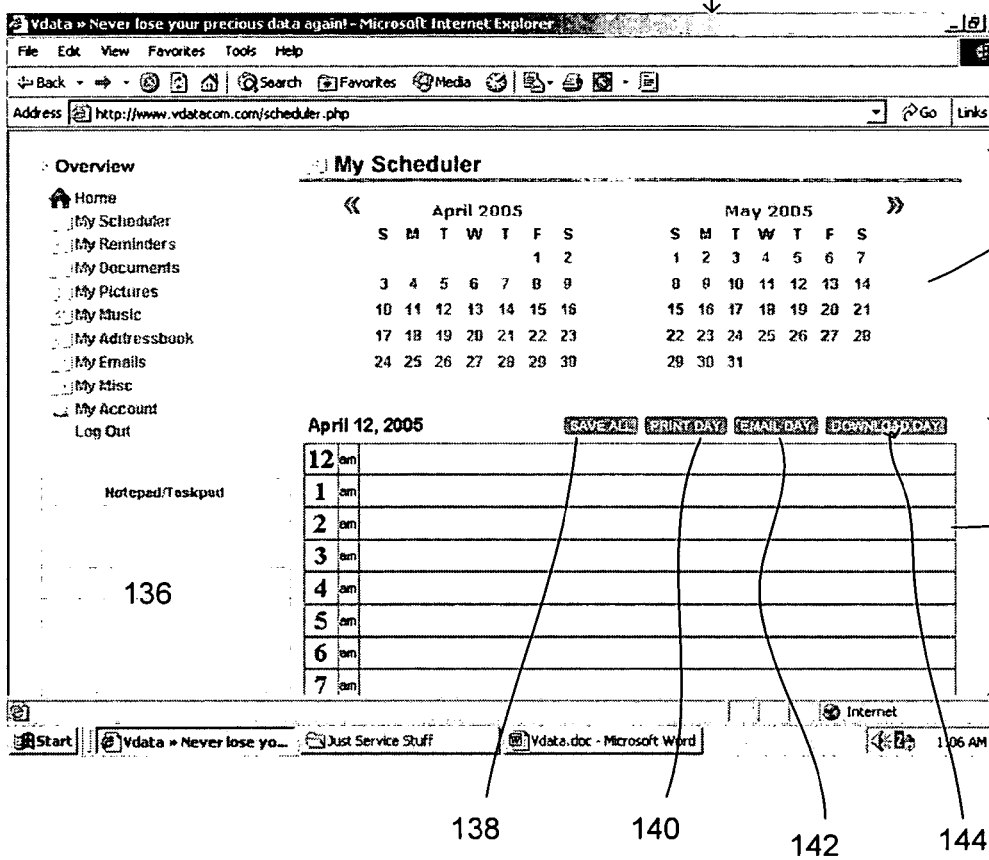
FIG. 9 is a display for a scheduler function for the data transfer system.

FIG. 9 shows the scheduler 130, which is accessed by selecting scheduler link 46 from account user screen 40. Scheduler 130 preferably has one or more monthly calendars 132 and a daily diary 134. The daily diary 134 displayed corresponds to the day selected on the monthly calendar, where the user can view previously entered appointments and reminders. This area also contains an optional task notepad 136 whereby the user can enter notes or other information.

Once a calendar entry has been entered, the user stores it by selecting the save button 138. The account user can also print his or her daily diary by selecting print button 140 or the user can email a daily calendar by selecting send button 142. Alternatively, the user can download the daily calendar by selecting download option 144. Preferably, the calendar function is compatible with the account user's mobile computer (s), such as a PDA.

Figure 10:
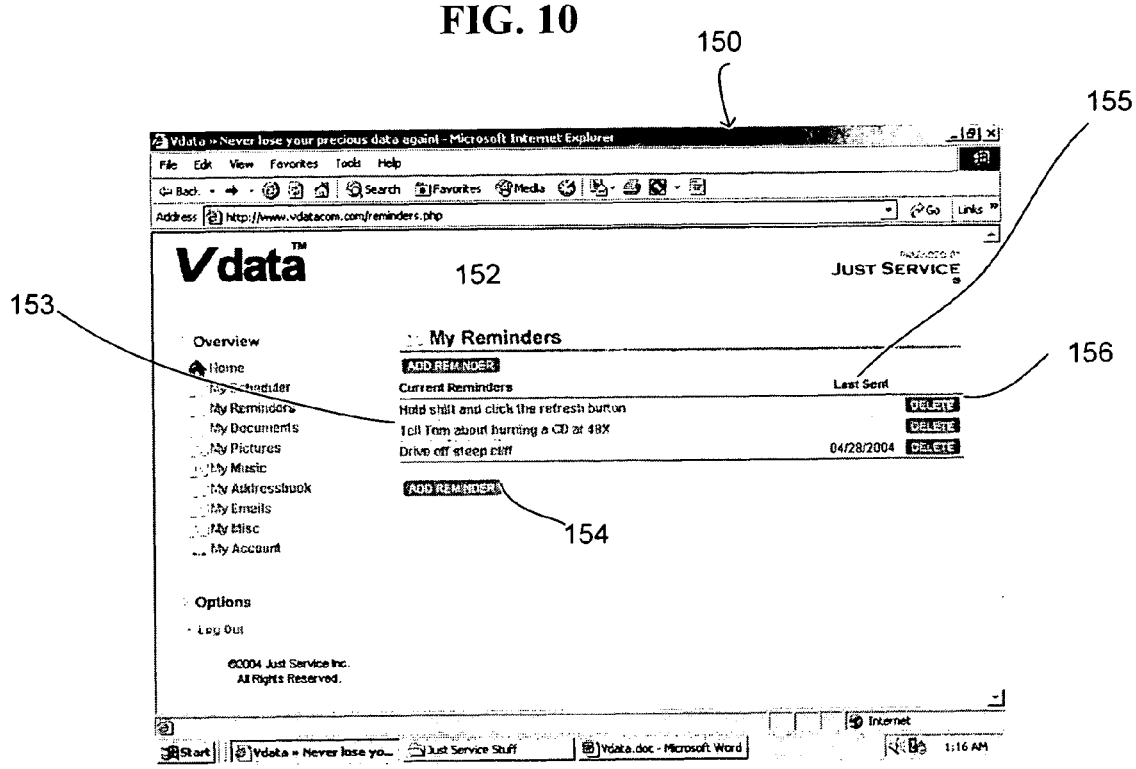
FIG. 10 is a display of a reminder function for the data transfer system.

The reminder system 150 is shown in FIGS. 10. It is accessed by selecting the reminder system link 48 from any screen. Reminder screen 152 as shown in FIG. 10 provides a list of reminders, including the subject 153 and an indication of the last time that the reminder was generated 155. The user may also add new reminders by selecting add reminder option 154, or delete an existing reminder using delete option 156. Each reminder may be added or deleted individually.

Figure 11:
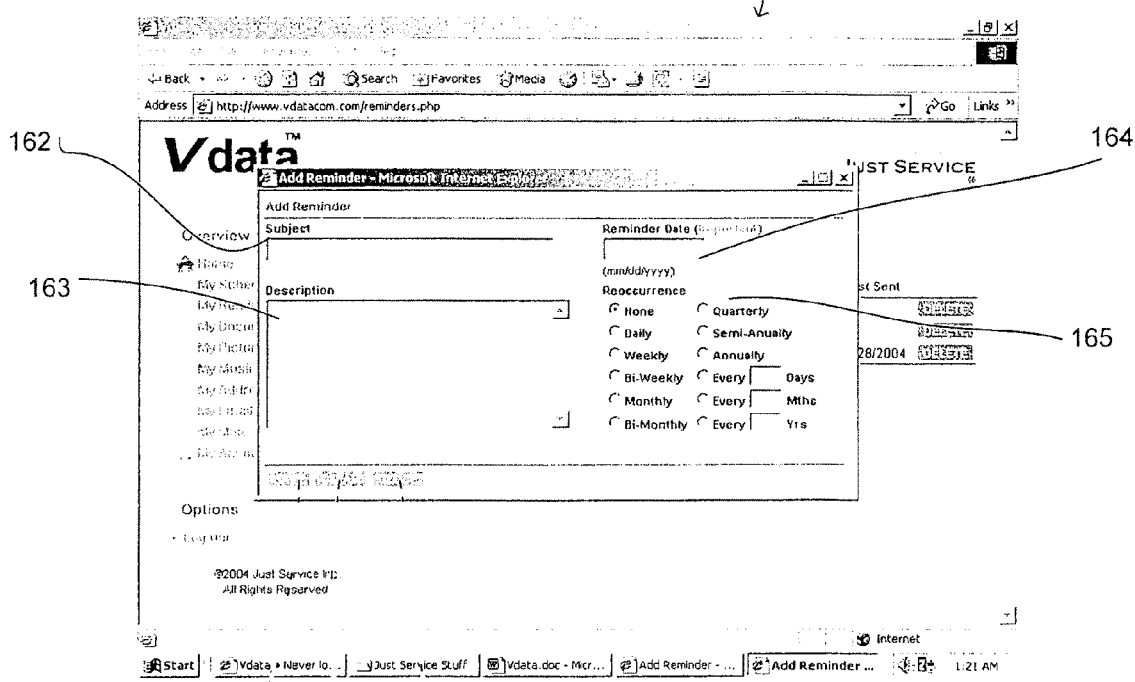
FIG. 11 is a display of a data entry screen for the reminder function.

If the user selects the add reminder option 152, an add reminder window 160 appears as shown in FIG. 11. Window 160 presents a template that directs the user to input a reminder subject 162, a reminder description 163, and an initial date 164 of the reminder. The user may also select a frequency 165 that this reminder may be generated. The frequency can either be a single occasion, or it can be set for any periodic reoccurrence period, including daily, weekly, biweekly, monthly, bimonthly, quarterly, semiannually, annually; or it can be set to occur at specified number of days, months, or years. The reminder function enables the user to enter data that may not necessarily be in computer form that is of particular importance, for example, scheduled payments such as tax or credit card payments, and appointments that may already be in the scheduler.

The system is programmed to generate an email reminder to the account user based on the reminder date 164 and additionally based on the reoccurrence frequency 165 specified. The account user email address is preferably the account email address 82 described above. The system could be modified to accept alternative email addresses, however. Furthermore, other types of reminders could be generated in addition to or in lieu of email. All of the reminder data as well as the software are resident in the system computer 12. Accordingly, reminders will not be affected if the account user computer 10 is damaged and replaced.

Figure 12:
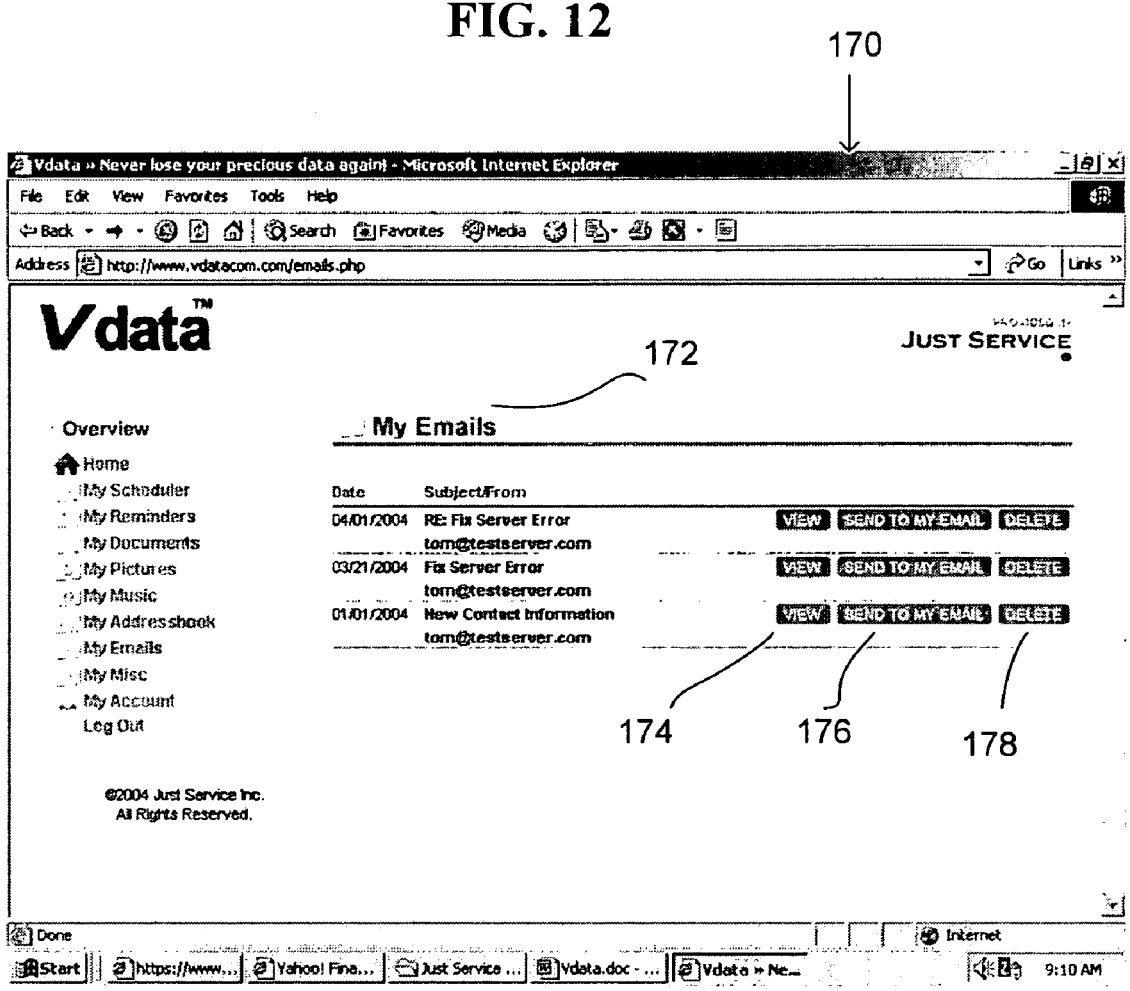
FIG. 12 is a display for an email storage function of the data transfer system.

Turning now to FIG. 12, an email storage system 170 lists the emails that have been saved to the system computer. Email can be saved to the system computer 12 by either forwarding selected emails to an email address associated with the system, or by exporting email from the account user email program. Saved email list 172 indicates the date that the email was originally received, the subject of the email and the original sender. To view a particular email, the user selects the corresponding view email button 174. To send a particular email to the user's current email account (as defined by email address 80 entered in the account manager), the user selects the email send option 176. To delete an email that is no longer of importance, the user selects the delete email option 178.

Figure 13:
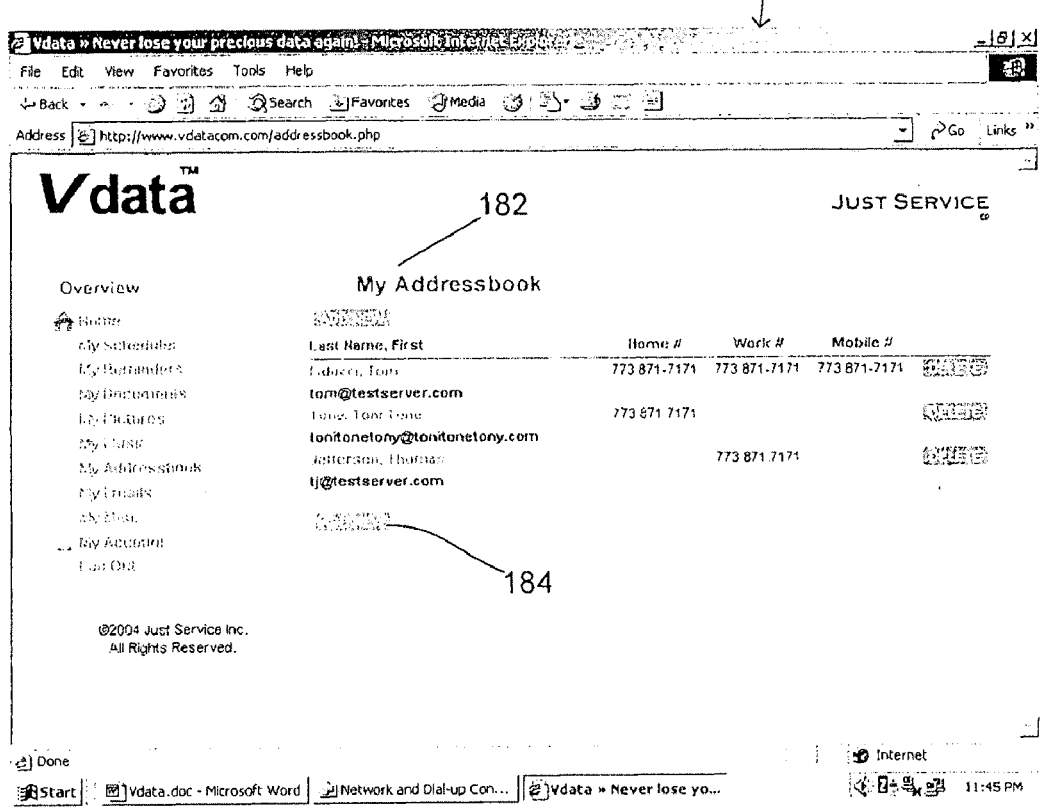
FIG. 13 is a display of the main screen for a contacts function of the data transfer system.

Turning to FIG. 13, the contact manager 180 is shown. Contact manager includes a contact list 182 where summary contact details are shown. Such summary contact details include the contact's name, email address, and phone numbers. To obtain more detailed information, the user selects the hyperlink associated with the entry, which is typically the contact's name. This screen also displays additional information and notes regarding the contact. To add a contact, add new contact button 184 is selected.

Figure 14:
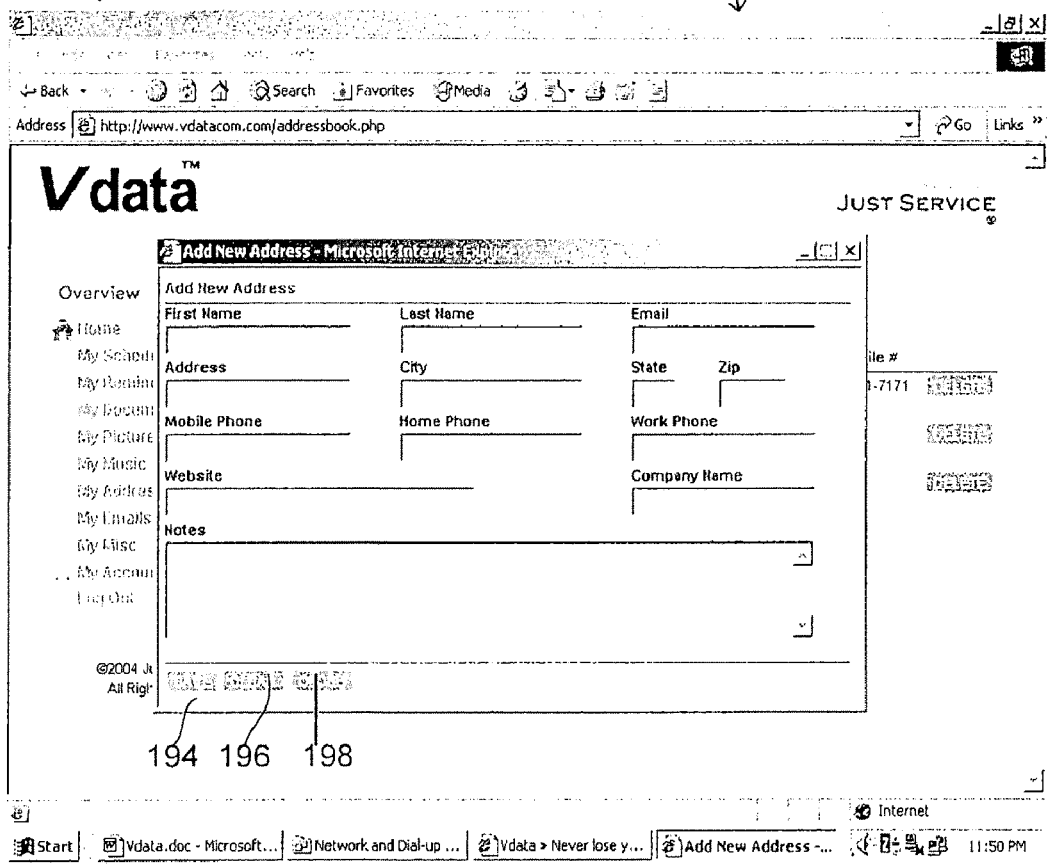
FIG. 14 is a display of a data entry screen for the contacts function.

The "Add New" button 184 launches contact adder 190, as shown in FIG. 14, which presents a template whereby the user can enter the aforesaid contact information. Once contact information has been entered, the user can save this information by selecting the save button 194. Alternately, the user can clear the contact fields by selecting the clear option 196. The close button 198 terminates the contact adder 190 and returns the user to the contact manager 180.

Preferably, the contact manager is compatible with PDAs, mobile telephones. Further, it is preferred that the account user computer contact files can be uploaded and stored in the contact manager. Thus, if the account user notebook computer, PDA or mobile phone is lost, damaged or stolen, the account user can log back into the system to download or view his/her contact data. This is also useful for individuals that upgrade or otherwise change equipment or service providers. In many cases, the address book from one mobile telephone will not work with another telephone. PDA handheld devices have the same problem; the data cannot be moved from one brand to another brand of PDA. With the present system the contact data stored in one mobile telephone or PDA can be transferred to another without compatibility problems.

Figure 15:
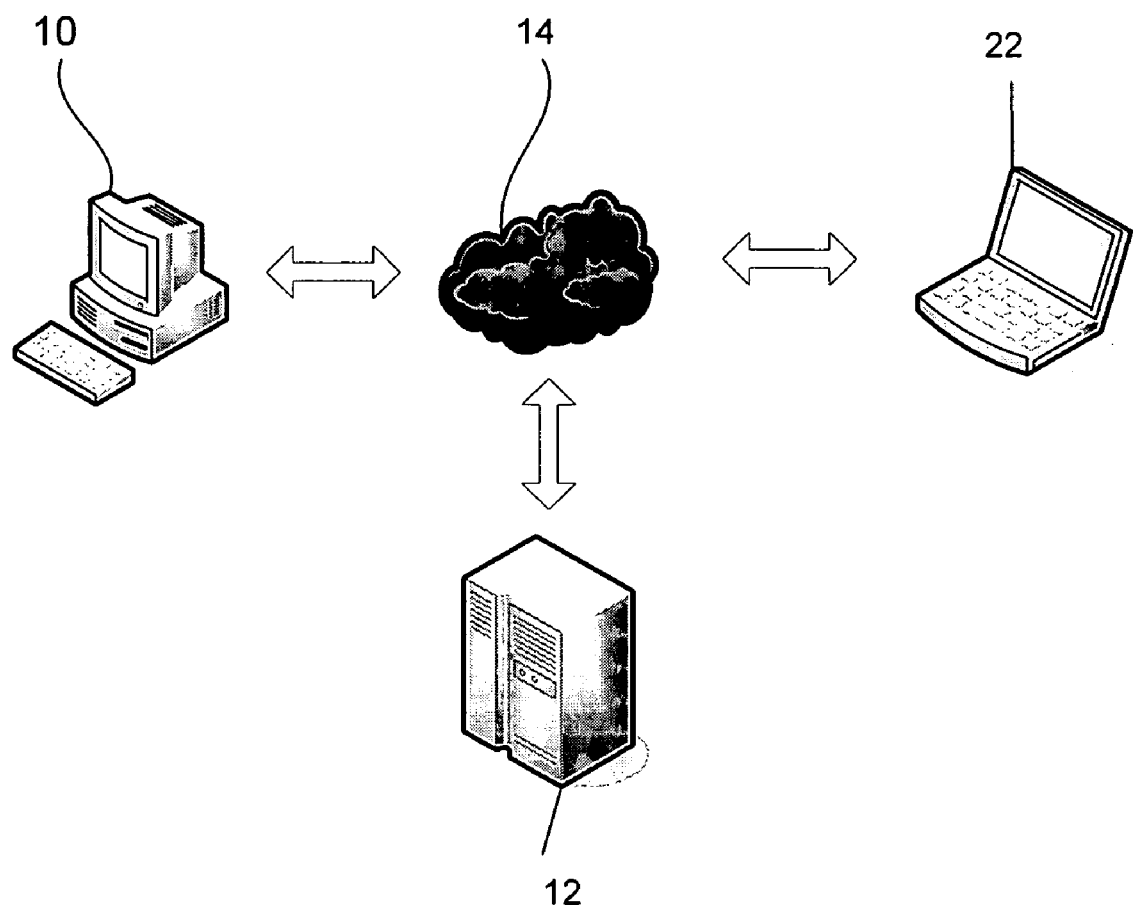
FIG. 15 is a schematic showing an account user and remote user connected a system computer over the Internet.
Figure 16:
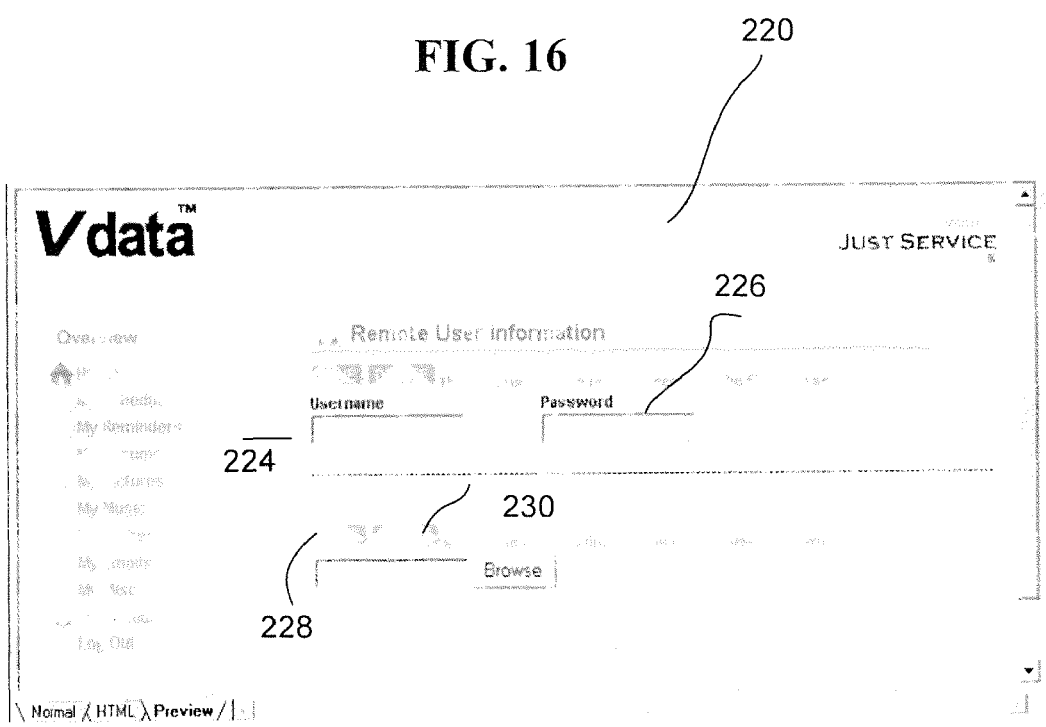
FIG. 16 is a display of an account user screen for provision of remote user access.
Figure 17:
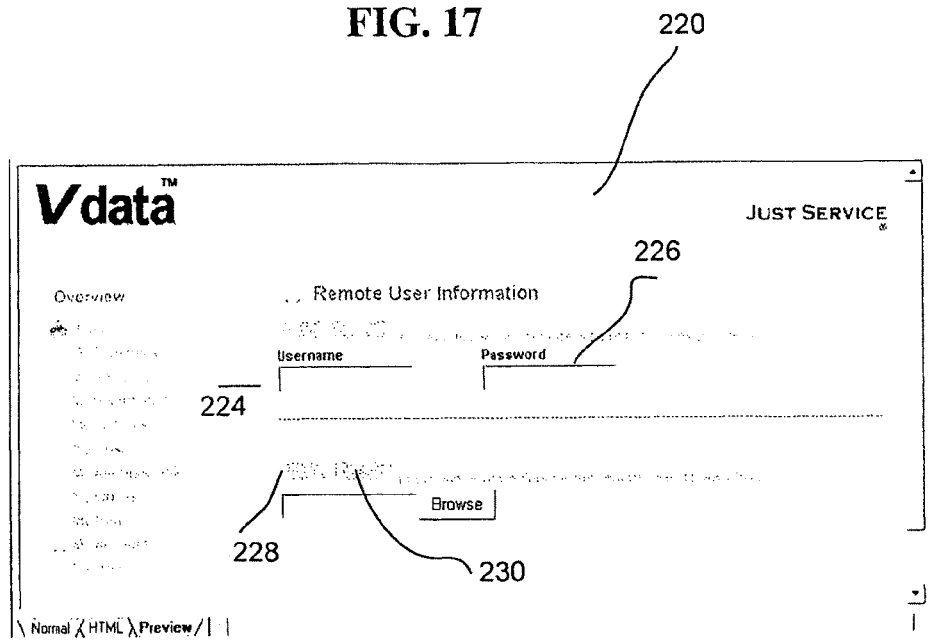
FIG. 17 is a display is a display of a remote user access screen.

The system also has a third-party data transfer function 210, as shown in FIGS. 15-17. Through this option an account user can use the system to transfer data to third parties, including files, folders and entire directories. Large data files and folders can be easily transmitted that normally, due to their size, would be difficult or impossible to transfer electronically. Conventional email programs typically have a size limit on the files that can be transferred, typically between 1 and 10 MB. An extremely large file or folder, for example multimedia data, may not be transferred easily. In the past such files could only be transferred by saving them on portable media such as a CD-ROM, a flash drive or ZIP drive and sending the media to the third-party.

The basic arrangement third party data transfer is shown in FIG. 15 wherein a file on account user computer 10 can be transferred to a third-party computer 22. To transfer data, the account user navigates to a remote user information screen 220 (FIG. 16) and creates a third-party identification, e.g., a user name 224 and password 226 for the third-party user. Once created, the account user then uploads the selected files to the system computer 12 in a manner similar to that described above in reference to document transfer. The files are copied to a storage device on system computer 12. The account user can save 228 or delete 230 files as desired. The account user then informs the third party of the web address of the system computer, and the third party user name and password, e.g., by telephone.

Turning now to FIG. 17, the third-party user navigates to the system website, where a Remote User login page 210 is located. The third-party can then login to the system computer to access and download the designated data 220. Preferably, the third-party user's access is limited to being able to download only the data specifically designated for transfer to the particular third-party by the account user. In addition, the third-party may be provided an option to upload files to the system for access by the account user. The third-party need not be an account user. Again, because all software is resident on the system computer, there is no need for third party to install or use any special hardware or software beyond a conventional web browser.

Figure 18:
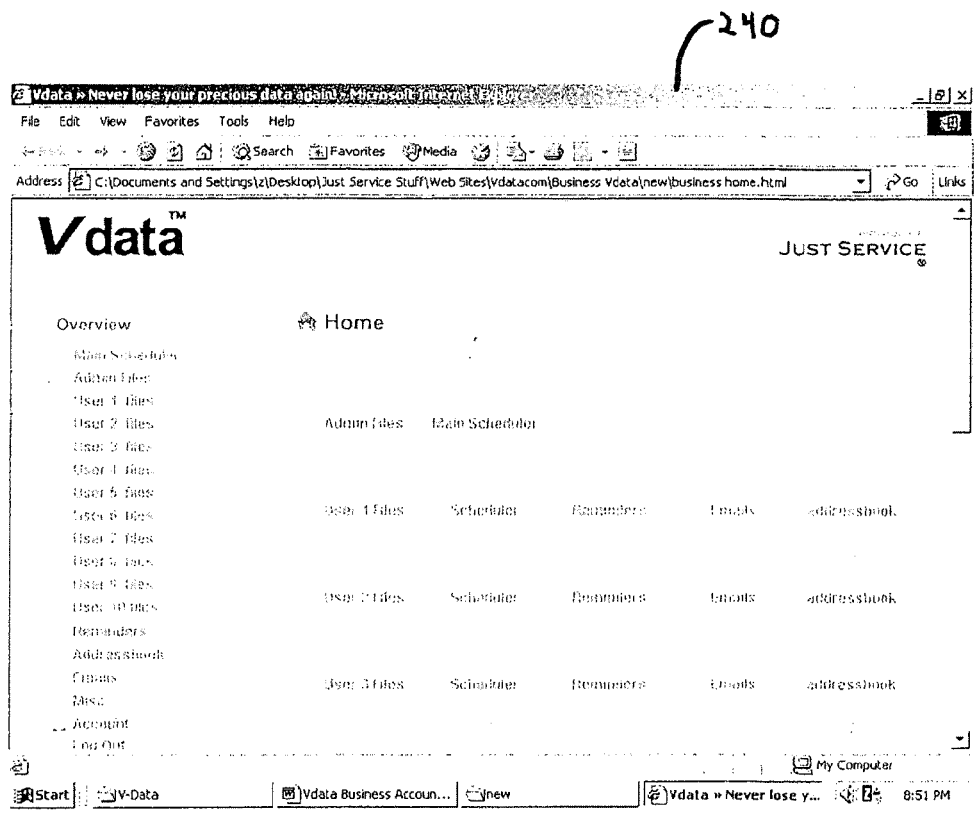
FIG. 18 is a display of an alternate multi-user embodiment of the data transfer system, showing an account administrator's screen.

FIG. 18 shows an alternate embodiment 240, particularly suited for business applications. In this system, a user account is divided into a plurality of sub-accounts. Preferably, a system administrator controls the respective properties of each sub-account. The system administrator may set up the account so that the levels of access for the sub-account users may vary. For example, a sub-account user may only be able to see his/her own files on the system computer. The sub-account user may also be limited in that he/she can only save files to the system computer but cannot access or download files from the system computer. Another user may be able to download and upload files but cannot delete any files. Another user may only be able to upload files with no other features allowed.

All sub-account files can be accessed by the system administrator, whereas to the individual user, his access will appear similar to that of the previous embodiment shown in FIGS. 1-14. The system administrator will see an array of folders with each user having his own set of folders. However, the system administrator will also have access to a master scheduler whereby he/she can create appointments or reminders that appear on the calendars of all of the sub-account users.

Figure 19:
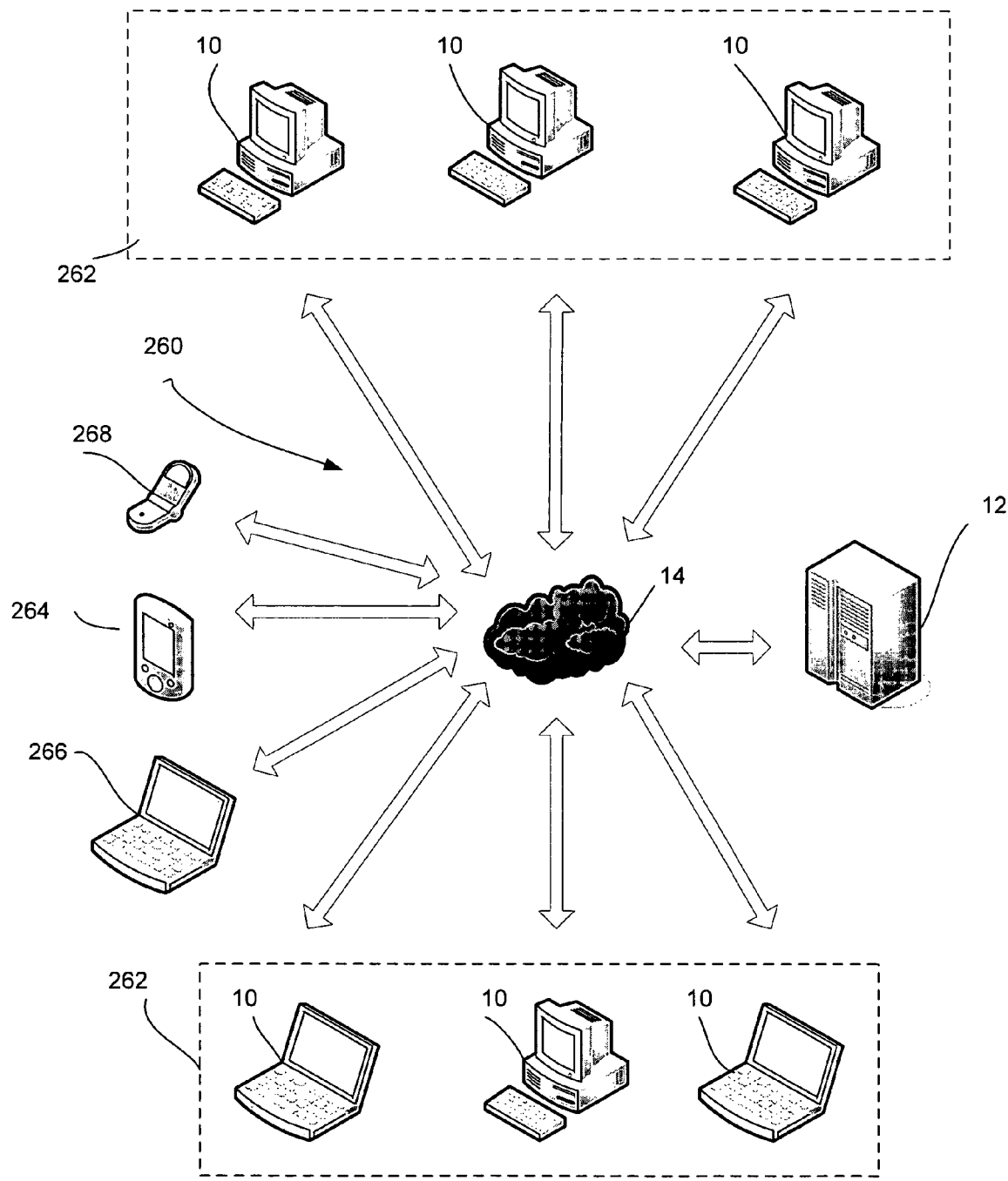
FIG. 19 is a schematic illustrating a virtual network.

FIG. 19 shows a schematic representation of a virtual server system 260 for a plural location business. The virtual server system comprises plural account user locations 262, a mobile personal data assistant 264, a mobile notebook computer 266, and a mobile telephone 268. Each location 262 has multiple computers.

The user of each computer including the mobile units 264, 266, 268 are preferably assigned a sub-account. The sub-account user computers may be linked in any manner to the Internet 14. The sub-account user computers may have individual Internet connections. Preferably each location 262 has a high speed Internet backbone. As with previous embodiments, a system computer 12 is operatively connected to the Internet 14. In this embodiment, it is not necessary for the locations 262 to have a local file server and related hardware. The system computer 12 functions as a virtual server for all locations as well as the mobile units. Thereby, the account user business can substantially reduce computer equipment and maintenance costs. Further, if the system server is operated and maintained by a third party, as contemplated, the overall savings to the account user business can be substantial. This is of particular value to start up businesses that lack the capital to purchase and maintain a local area computer network, businesses with multiple locations, and businesses where employees are frequently away from the office, e.g., salesmen.

Figure 20:
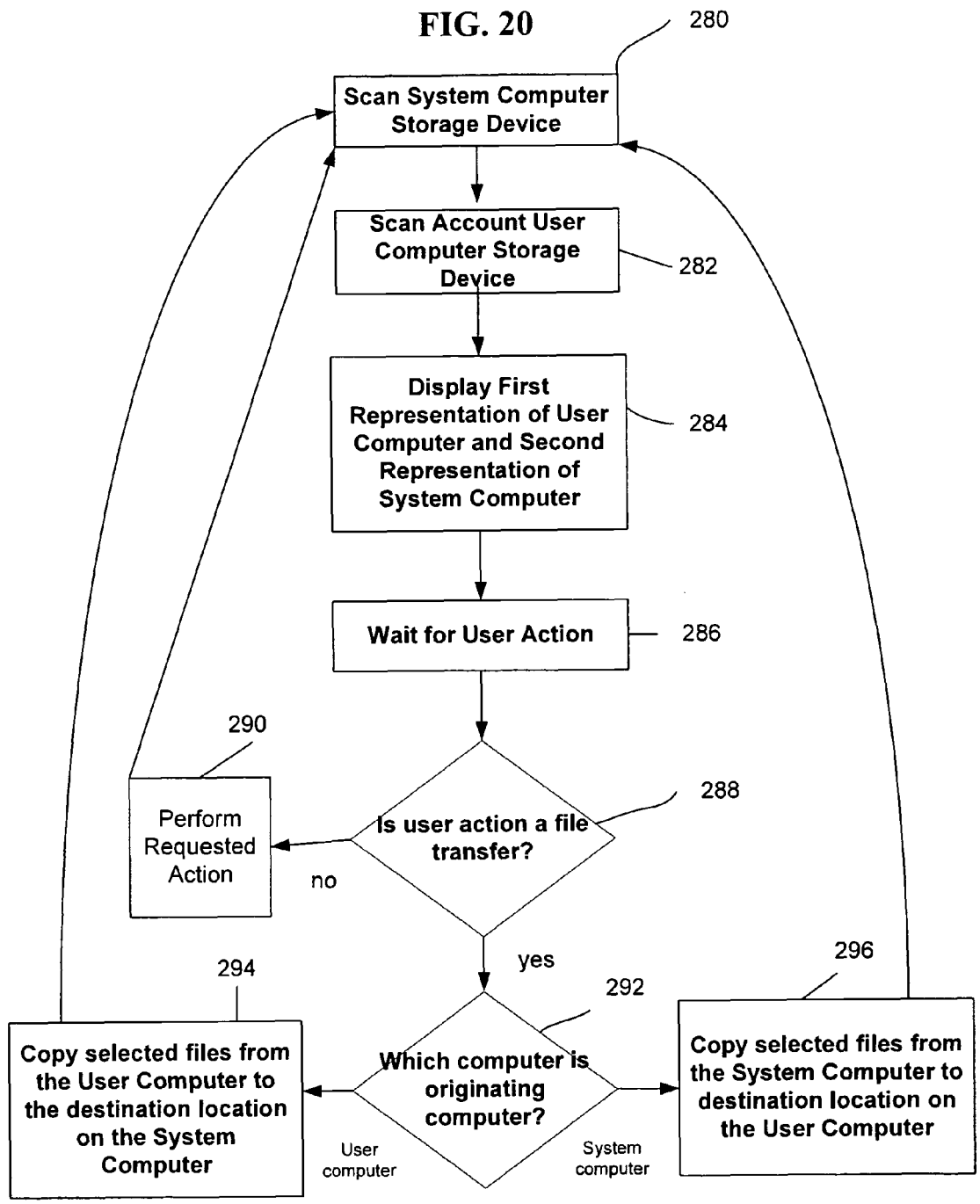
FIG. 20 is a flowchart illustrating the operation of the file transfer system shown in FIGS. 6-8.

Turning now to FIG. 20, a flow chart for method and computer program embodiments of the data backup systems is provided. When a file transfer system option is selected, see FIG. 6, the program first scans the system computer storage device 20 at step 280 locating data files and folders associated with the account user. At step 282, the program scans the account user's computer storage device 18. After completion of these two steps, the program displays 284 on the account user's computer display a first representation of at least a portion of the user computer storage device 91 and a second representation of at least a portion of the data files and folders associated with the user's account of the system computer 92 (as shown in FIG. 6). The program then waits for a user action at step 286.

When the user initiates an action, for example, by pressing one of buttons 93-103, the computer evaluates which action has been requested at step 288. At step 288, the program determines whether a file transfer action has been requested (i.e., has the user pressed button 93 or 94). If the user selected a different option, the system proceeds to step 290, performs the requested action (make a new directory, delete a file, etc.) and returns to step 280.

If a file transfer option is selected, the process then proceeds to step 292, which determines which computer is the originating computer for the requested file transfer. If the user computer is the originating computer then the selected files are copied from at least one storage device 18 on the user's computer 10 to the destination location of the storage device 20 on the system computer 12 as show at step 294. If the system computer is the originating computer then the selected files are copied from the storage device 20 on the system computer 12 to the destination location on the storage device on the account user computer 12 as shown at step 296. After either step 294 or step 296, the program cycles back to step 280.

Figure 21:
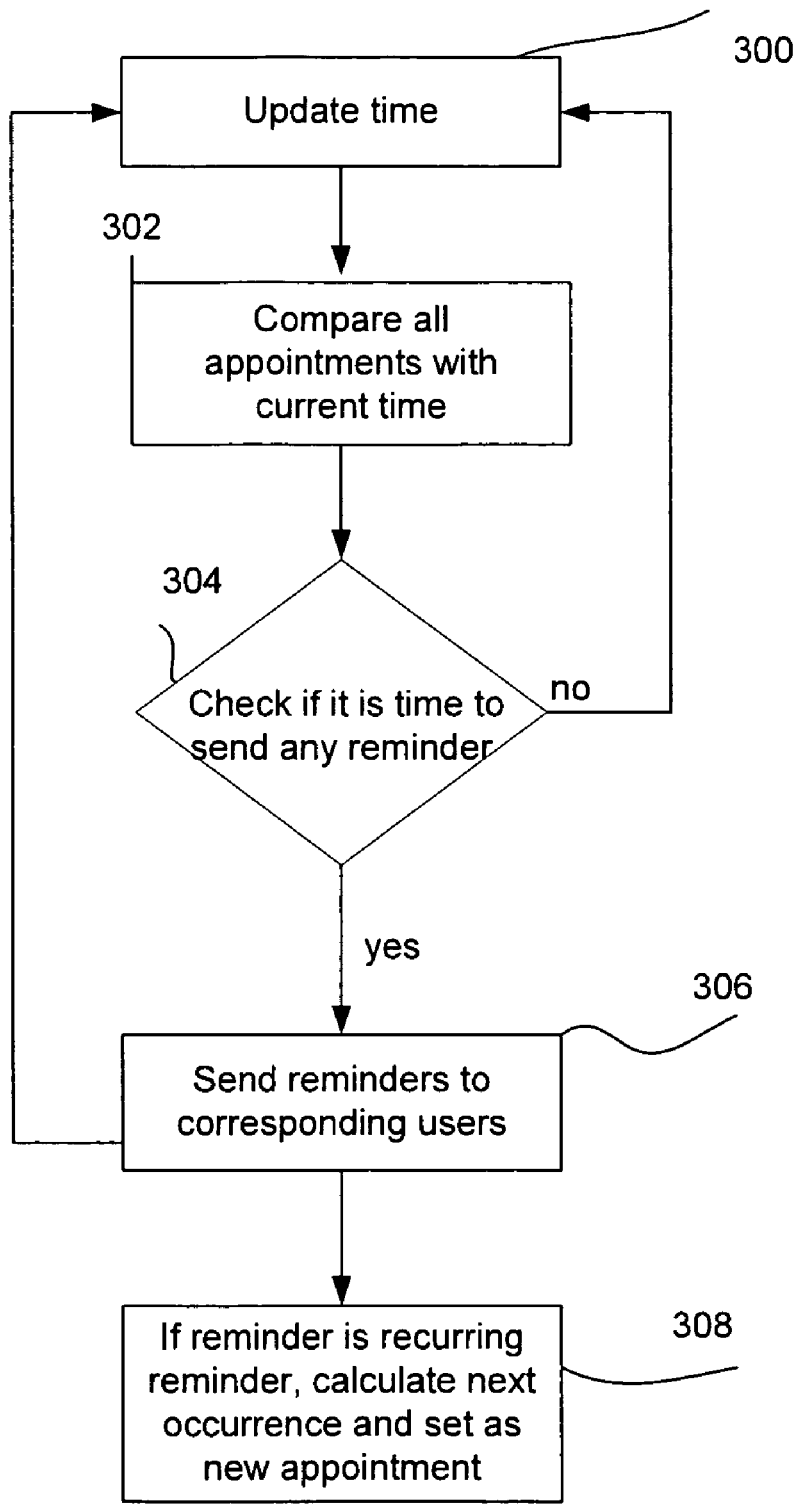
FIG. 21 is a flowchart illustrating the operation of the reminder system shown in FIGS. 10-11.

FIG. 21 shows a method of operation a computer program embodiment of the system reminder function. At step 300, the program checks the current time as determined by a system clock incorporated into system computer 12. At step 302, the program compares all appointments with the current time. At step 304, the program determines if it is time to send any reminders by looking for matches between the current time and the times associated with appointments entered by users into the system. If there are no matches, then the system cycles back to step 300. If a match is found, the system sends and email reminder 306 to the email address stored in the account setup. The system then checks to see if the reminder was designed by the user to be a recurring reminder at step 308. If the reminder is a recurring reminder, the system then calculates the next occurrence of the appointment by adding frequency 165, and schedules a new reminder.

While a particular embodiment of the file backup system has been described herein, it will be appreciated by those skilled in the art that changes and modifications may be made thereto without departing from the invention in its broader aspects and as set forth in the following claims.

The invention claimed is:

1. A data storage system having a plurality of accounts for copying selected data files between one or more account user computers and a system computer, each account user computer having a storage device, a display and means for operative connection to the Internet, the data storage system comprising:

the system computer having a system storage device with means for storing and selectively retrieving data files for each respective account, and file transfer software wherein the file transfer software is exclusively stored on the system computer; the system computer being operatively connected to the Internet and having means for the account users to access the system computer through a system website using a web browser;

means for verifying account user identification for each account user computer seeking access to the system computer via the Internet wherein the account user identification comprises a code unique to and embedded in the account user computer;

the system computer including means for scanning the storage device of a linked verified account user computer;

the system computer including means for causing a list of data files stored on the linked account user computer storage device and a list of data files stored on the system computer storage device for the corresponding verified account to be displayed in the web browser on the linked account user computer display;

means for receiving information indicating user selected data files from the list of data files stored on the linked verified account user computer storage device and the list of data files stored on the system computer storage device for the corresponding verified account; and means for downloading selected data files from the linked account user computer storage device to the system computer storage device for the corresponding verified account and uploading selected data files from the system computer storage device for the corresponding verified account to the linked account user computer storage device.

2. The system of claim 1, wherein the account user identification comprises an account user name and associated password.

3. The system of claim 1 wherein the displaying means displays the list of data files stored on the linked account user computer storage device and the list of data files stored on the system computer storage device for the corresponding verified account in a single window in the web browser on the linked account user computer display.

4. The system of claim 1, further comprising the system computer including means for storing at least one appointment date for at least one account user, and means for generating at least one appointment reminder for the appointment date.

5. The system of claim 4, wherein the system computer has means to store at least one electronic communication address for each account user, and wherein the appointment reminder is an email transmitted from the system computer to the email address associated with the at least one account user.

6. The system of claim 1, wherein at least a portion of the accounts have sub-accounts each having a sub-account identification, further comprising means for verifying sub-account identification.

7. The system of claim 6, further comprising means for setting varying levels of access for each sub-account.

8. The system of claim 6, further comprising a master scheduler means for entering appointments for all or selected sub-accounts, whereby appointment entries in the master scheduler are placed on calendars for all or selected sub-accounts.

9. A computer program product comprising computer executable instructions stored exclusively on a system computer readable medium comprising:

checking for an operative connection between the system computer and the Internet, and if the system computer is operatively connected;

linking the system computer with an account user computer having a storage device based on verification of an account user identification;

scanning the data files and directories of the linked user computer storage device;

scanning the contents of data files and directories of a storage device on the system computer associated with the account user identification;

displaying data files and directories stored on the linked user computer storage device and data files and directories stored on the system computer associated with the account identification in a single window in a first web browser on the linked user computer display;

downloading selected data files from the linked user computer storage device to the system computer storage device associated with the account user identification and uploading selected data files from the system computer storage device associated with the account user identification to the linked user computer storage device;

associating a third party identification with the selected data files;

linking the system computer to a third-party computer based on verification of a third-party identification;

displaying in a second web browser on the linked third-party computer the selected data files associated with the corresponding third party identification; and uploading the selected data files from the system computer to the linked third-party computer.

10. A computer program product as in claim 9, further comprising storing at least one email address for an account, storing at least one appointment date and associated message for at least one user account, comparing a current date with stored appointment dates, and when the current date equals an appointment date, generating an email reminder with an associated message to the account email address.

11. A computer program product as in claim 10, wherein the program executes the step of generating periodic email reminders on predetermined time intervals.

12. A method for a system computer to upload and download data between the system computer and a plurality of account user computers, each account user having a system account and an account user identification, the system computer operatively connected to the Internet and accessible through a system website using a web browser, the system computer having a data storage device capable of storing and retrieving unique user data for each of a plurality of system accounts, comprising the steps, for each user account:

linking the system computer to a first computer via the Internet;

receiving an account user identification from the first computer;

verifying the account user identification, and if verified, scanning a storage device of the first computer, downloading selected unique user data files from the first computer storage device and storing the unique user data files on the system computer storage device, linking the system computer with a second computer via the Internet, wherein the second computer is one of a repaired first computer and a replacement for the first computer, the second computer having a second computer storage device;

receiving an account user identification from the second computer;

verifying the account user identification, and if verified;

uploading at least a portion of the selected unique user data files stored on the system computer storage device to the second computer storage device.

13. A method as in claim 12, wherein the first computer is one of an office computer or home computer, and the second computer is the other.

14. A method as in claim 12, further comprising displaying on a display of the second computer, at least a portion of the contents of data previously stored on the system computer for that account.

15. A method as in claim 12, further comprising the step of simultaneously displaying on the second computer display a representation of at least a portion of the contents of a storage device of the second computer.

16. A method for a system computer to copy data from and to a plurality of account user computers, comprising the steps of:

establishing a plurality of system accounts, each account having an account user identification;

providing a system computer having a data storage device and file transfer software wherein the file transfer software is exclusively stored on the system computer, the data storage device capable of storing and retrieving data for each system account;

operatively connecting the system computer to the Internet;

providing account users access to the system computer via the Internet through a system website using a web browser;

verifying account user identification for each user computer seeking access to the system computer, and if verified for access, for each account:

operatively connecting the system computer to the account user computer;

scanning the contents of a storage device for the account user computer;

displaying in a single window in the web browser on a display of the account user computer a list of at least a portion of the data files stored on the account user computer storage device and at least a portion of the data files stored on the system computer for that account;

downloading selected data from the account user computer to the system computer and uploading selected data from the system computer to the account user computer.

17. A data storage system having a plurality of accounts for downloading selected data files and directories from one or more account user computers and uploading selected data files and directories from a system computer to one or more account user computers, each account user computer having a storage device, a display and means for operative connection to the Internet using a web browser, the data storage system comprising:

the system computer having file transfer software wherein the file transfer software is exclusively stored on the system computer, a system storage device adapted for storing and selectively retrieving data for each respective account, the system computer being operatively connected to a network;

software on the system computer for verifying account user identification for each account user computer seeking access to the system computer via the network;

the system computer adapted for scanning the storage device of a linked verified account user computer;

the system computer including software for displaying in a single window a list of data files and directories stored on the linked account user computer storage device and a list of data files and directories stored on the system computer storage device for the corresponding verified account on the linked account user computer display;

software allowing the system computer to receive information indicating selected data files and directories from the list of data files and directories stored on the linked verified account user computer storage device and the list of data files and directories stored on the system computer storage device for the corresponding verified account; and software allowing the system computer to download selected data files and directories from the linked account user computer storage device and to store the selected data files and directories on the system computer storage device for the corresponding verified account and to upload selected data files and directories from the system computer storage device for the corresponding verified account to the linked account user computer storage device.

18. The system of claim 17 wherein a plurality of authorized users can access the data files and directories stored on the system computer storage device for the verified user account.

* * * * *